July 25, 1933.   E. G. DEUCHER   1,919,360
CRANE FRAME
Filed March 25, 1931
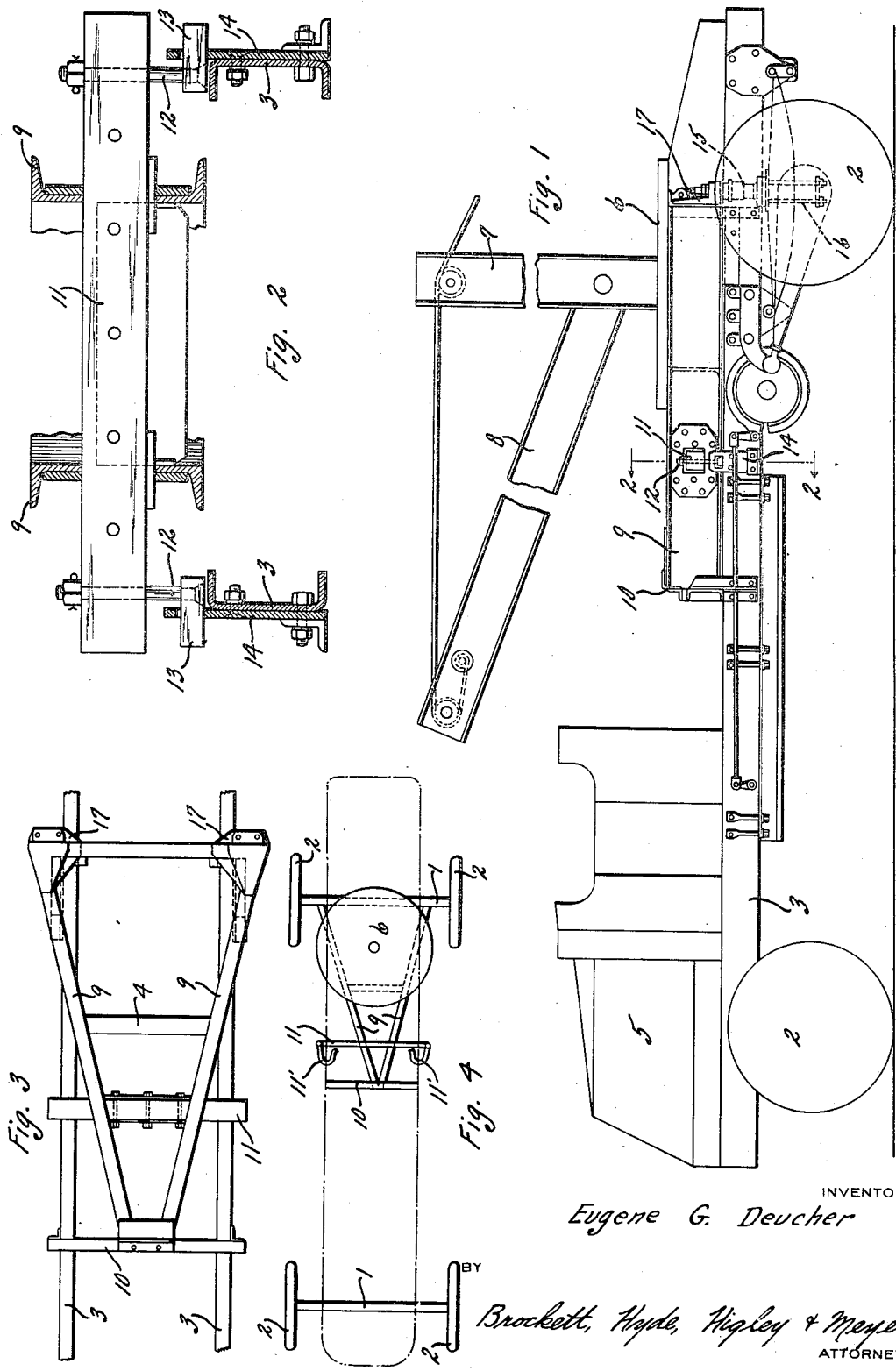
INVENTOR
Eugene G. Deucher
BY
Brockett, Hyde, Higley & Meyer
ATTORNEYS Patented July 25, 1933

1,919,360

UNITED STATES PATENT OFFICE

EUGENE G. DEUCHER, OF CLEVELAND, OHIO, ASSIGNOR TO THE UNIVERSAL CRANE COMPANY, OF LORAIN, OHIO, A CORPORATION OF OHIO

CRANE FRAME

Application filed March 25, 1931. Serial No. 525,159.

My invention relates to a crane frame and, particularly, to a supporting frame adapted to be mounted on a vehicle chassis and, in turn, support a structure such as a crane, drag line, or the like that embodies a swinging boom so mounted and operable that the center gravity thereof is shiftable in an arcuate path relative to the supporting frame.

The invention is especially applicable to a frame adapted to be mounted on a motor truck of standard design wherein the main load supporting points are over the rear axle and as near as possible to each rear wheel journal while minor load supporting points are along the chassis frame side rails. Although ordinary heavy duty trucks have sufficiently strong rear running gear to meet standard crane requirements, the individual chassis frame members are invariably far below the strength required. The problem, therefore, is to provide a crane base frame that will throw its load on the truck chassis frame where the structure can most effectively handle it. Heretofore, the side rails of the truck chassis frame have been increased in size and strength which is undesirable primarily because of the increase in weight and the necessity of building a special truck chassis or substantially reenforcing the usual chassis when the truck is to be used as a crane or drag line structure support.

One object of my invention is to provide a supporting or crane frame of such nature that the entire load that may at any time come onto the chassis frame of a truck is concentrated on a single point where all chassis frame members can jointly share in sustaining it instead of on any one of several points thereby eliminating the necessity of chassis frame reinforcement on short wheel base trucks.

Another object of my invention is to provide a crane frame that, while concentrating the entire load on a single point of the chassis frame, offers the chassis frame no restraint against flexing and winding according to road conditions.

A further object of my invention is to provide a crane frame whose anchorage to the truck frame is relatively simple thereby reducing the work necessary to mount a crane on a truck chassis and, at the same time, provide a crane frame such that unavoidable load handling shocks will be delivered to the truck chassis in a manner to spread simultaneously over all members thereof and thereby avoid damage.

A still further object of my invention is to provide a means in conjunction with the crane frame to prevent twist of the truck frame that is more severe than the truck frame will stand without injury.

Various other objects and advantageous features of my invention may be seen in the following description and one embodiment thereof may be seen in the accompanying drawing wherein similar characters of reference designate corresponding parts, and wherein:

Fig. 1 is a side view, partly diagrammatic, showing a crane frame constructed in accordance with my invention and mounted on a motor truck chassis; Fig. 2 is a sectional view taken on the line 2—2 of Fig. 1; Fig. 3 is a fragmentary plan view showing the crane frame mounted on the truck chassis frame; and Fig. 4 is a diagrammatic plan view of the crane frame mounted on a truck chassis frame.

Referring to the drawing, I have shown my invention in conjunction with a motor truck of the ordinary construction consisting of rigid front and rear axles 1 with traction elements 2 mounted thereon and a generally flexible chassis frame connecting the two axles and consisting of side rails 3 and suitable cross rails or braces 4.

Established truck practice uses the front axle principally as a carrier for a power plant as diagrammatically shown at 5 and as an operating machinery carrying while the rear axle bears the greater part of the haulage load burden and only unbalanced portions of the haulage load are thrown on the front axle. Further, established practice has it that it is essential that the front and rear axles of trucks can freely adjust themselves to unevenness of the load regardless of the mutual alignment of the axles and the connecting chassis frame is therefore built so as to be flexible and is spring mounted on the front and rear axles.

In accordance with my invention, a supplementary frame is mounted on the truck chassis frame to serve as a support for a crane or other structure embodying a turntable 6, upright support 7 and swinging boom 8, this frame consisting of two side rails 9 having their respective rearwardmost ends or main load supporting points over the rear axle and as near as possible to the respective rear wheel journals. These rails converge forwardly in the general direction of the front axle and are supported at a central point that is preferably substantially half the length of the chassis span forward between the front and rear axles and about midway between the two side rails 3, the ends of the rails 9 being supported on a cross member 10 extending transversely across the chassis frame.

The supplementary frame is substantially triangular in shape and is provided with a cross member 11 between the diverging ends of the side rails 9 and the point of convergence of the side rails and being preferably near the point of convergence of the rails as shown in Figs. 1, 3 and 4. As shown in Fig. 2, this cross member 11 is so supported by the supplementary frame as to not rest upon the side rails 3 of the truck chassis frame. However, the cross member 11 is loosely connected to the side rails 3 by means of downwardly extending bolts 12 carrying laterally extending members 13 that project through openings in plates 14, the openings being substantially larger than the members 13 to afford a certain amount of vertical play of the members 13.

In the assembly of this apparatus, it is necessary that the side rails 3 be rigidly secured to the rear axle when the unit is set up for crane operation instead of being spring supported thereon. To accomplish this, adjustable means 15 may be used in combination with the spring shackle 16 and a bracket 17 on the supplementary frame to hold the side rails 3 against vertical movement relative to the rear axle. This is necessary to eliminate the usual flexibility and twisting possible in the side rails when such side rails are spring supported on the rear axle.

In the operation of this frame, the side rails 3 having been first "tied down" on the rear axle and the supplementary frame and parts carried thereby mounted on the truck chassis frame, it is understood that swinging of the boom 8 by rotation of the table 6 shifts the center of gravity of the load stress applied to the chassis frame and thereby tends to shift the point of load support on the chassis frame. With my construction, regardless of the position of the center of gravity of the load, the center load support will be substantially equally divided between the side rails 3 which are, as is well known, the weakest part of a chassis frame. This is accomplished by causing the load stress to be exerted at a point substantially intermediate the two side rails whereby the load will be equally distributed on each rail. Thus, the necessity of reenforcing the ordinary side rails or/of constructing special side rails is dispensed with inasmuch as both side rails instead of only one support the load at all times.

Change in the center of gravity of the load will cause a twisting stress to be exerted on the chassis frame when the center of gravity is in certain positions of its normally arcuate path and to prevent such twisting stress from injurying the chassis frame, the stirrup members shown diagrammatically in Fig. 4 and indicated by the numeral 11' are provided. These stirrup members consist of the bolts 12, plates 14 and laterally extending members 13 hereinbefore described and serve to permit only a slight twisting movement of the frame until the laterally extending members 13 contact with the tops of the opening in the plates 14 which applies the twisting stress to two spaced points on each side rail whereupon the whole side of the chassis frame opposite the center of gravity of the load will be tipped or raised instead of one end thereof being raised while the other remains substantially stationary due to its weight which causes the twisting stress on the frame. In some instances, the stirrup members may have further use in providing means for mounting the well known outrigger structure or supplemental wheel supports so that the stability of the device is not limited to the stability of the truck chassis as it is usually built.

Referring to the drawing and the preceding description, it will be seen that I have provided a crane frame in combination with a vehicular chassis frame embodying numerous novel and advantageous features. For instance, I have provided a frame wherein the load stress heretofore normally exerted on each side rail individually is exerted on both side rails and divided between the two in such manner that the benefit of a side rail of substantially double strength as compared to the normal side rail is obtained without changing the usual side rails on a vehicle chassis.

Another important feature resides in the fact that I have provided a means for preventing a sufficient amount of twisting stress on the chassis frame to cause injury to the frame side rails or the side rail connections. Various other advantageous features will be readily apparent.

What I claim is:

Apparatus of the class described comprising, in combination with a vehicular chassis embodying front and rear pairs of traction elements and spaced side rails as a connecting means therebetween, means for supporting a load weight on said chassis including means for distributing the weight of the load on the two spaced side rails regardless of the position of the center of gravity of the load, said supporting means including a triangular frame having one of its points of rest intermediate said spaced side rails, and means for preventing excessive twisting stress on said side rails when the center of gravity of the load is to one side of the longitudinal center line of the chassis, said last named means including stirrup members connected to said triangular frame and said side rails respectively and normally in ineffective position.

EUGENE G. DEUCHER.